United States Patent

Mattarocci

[15] 3,641,699
[45] Feb. 15, 1972

[54] FISHING WEIGHTS

[72] Inventor: Domenic Mattarocci, 2120 West 31st St., Pueblo, Colo. 81003

[22] Filed: Oct. 24, 1969

[21] Appl. No.: 869,111

[52] U.S. Cl. .................................. 43/43.1, 43/44.89
[51] Int. Cl. ............................................. A01k 95/00
[58] Field of Search ............... 43/44.89, 44.92, 44.97, 43.1, 43/44.83, 44.84; 24/115 K, 123 H, 129 R

[56] References Cited

UNITED STATES PATENTS

| 883,048 | 3/1908 | Pflueger | 43/43.1 |
| 685,263 | 10/1901 | Decor | 43/43.1 |
| 2,313,647 | 3/1943 | Knill et al. | 43/43.1 |

FOREIGN PATENTS OR APPLICATIONS 1,097,823   2/1955   France..................43/44.89

Primary Examiner—Samuel Koren
Assistant Examiner—Daniel J. Leach
Attorney—Victor J. Evans & Co.

[57] ABSTRACT

Fishing weights are set forth which are snag free and which can be attached to the line or leader handily. A snap-on hook projects from one end of one form of the invention and in another form the opposite ends of the weight have line receiving bores and grooves to attach the weight to the line. The weights are long and thin to prevent fouling and a split weight is provided of the same nature for squeeze clamping on the line or leader.

1 Claim, 11 Drawing Figures

PATENTED FEB 15 1972 3,641,699

INVENTOR.
DOMENIC MATTAROCCI
BY
Victor J. Evans & Co.
ATTORNEYS.

FISHING WEIGHTS

BACKGROUND OF THE INVENTION

Field of the Invention

The present invention relates to fishing weights and the means for attaching the weights to a fish line or leader to avoid snagging the weights when used in water having weeds and other materials the weight could snag on. In some forms of the invention, quick attaching means are provided for attaching the weights to the leader without the necessity of tying special loops in the line.

SUMMARY OF THE INVENTION

The present invention relates to an elongated fish weight which is pointed at its upper end to decrease the possibility of snagging on foreign material in the water. In one modification of the invention, a snap hook is provided on the lower end of the weight to permit the leader and hook to be attached thereto. In another form of the invention, a spring-attaching loop is pivotally connected to the lower end of the weight, and in still another form of the invention, a groove is formed in the weight which receives the line or leader and the weight is then compressed about the line or leader to secure the weight to the line or leader.

The primary object of the invention is to provide a fish weight which is substantially snag free and which can be attached to the tackle in a minimum of time with a minimum of effort.

Other objects and advantages will become apparent in the following specification when considered in the light of the attached drawings.

DESCRIPTION OF THE PREFERRED EMBODIMENT

Figure 1:
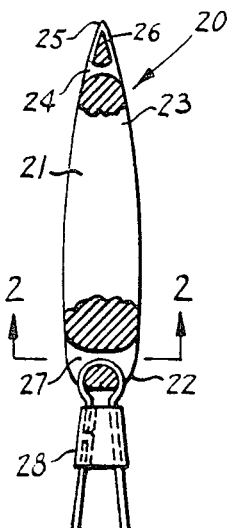
FIG. 1 is a side elevation of the invention shown partially broken away and in section for convenience of illustration.

Referring to the drawings in detail wherein like reference characters indicate like parts throughout the several figures the reference numeral 20 indicates generally a fishline weight constructed in accordance with the invention.

The fishline weight 20 has a generally circular solid body 21 having a blunt lower end 22 and a conically tapering upper end 23.

A bore 24 pierces the body 21 in the tapering upper end 23 adjacent to the upper end 25 of the body 21. A groove 26 extends longitudinally of the body 21 from the bore 24 at each end thereof to the end 25 of the body 21. A line or leader (not shown) is adapted to extend through the bore 24 and to be tied so as to lie in the groove 26 to prevent it from being dislodged from the body 21.

A bore 27 extends through the body 21 adjacent the blunt end 22 thereof with the bore 27 extending substantially parallel to the bore 24. A conventional snap hook 28 extends through the bore 27 and depends from the body 21 as can be seen in FIG. 1 for attaching the leader or hook to the fish weight 20.

The fish weight 20 has a length substantially greater than three times the maximum diameter of the body 21 in order that a slim form is produced. Other than the bores 24, 27 and the groove 26, the outer surface of the body 21 is completely smooth to diminish greatly the possibility of snagging the fish weight 20.

Figure 4:
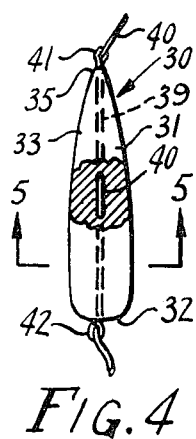
FIG. 4 is a side elevation shown partially broken away and in section of a modified form of the invention.
Figure 5:
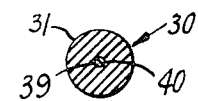
FIG. 5 is a transverse sectional view taken along the line 5—5 of FIG. 4 looking in the direction of the arrows.

Referring now to FIGS. 4 and 5, the modified form of the invention is illustrated wherein a fish weight 30 includes a body 31 having a generally circular cross section and tapering at 33 in a generally conical form to the upper end 35 thereof. The upper end 35 terminates in a substantial point while the lower end 32 of the body 31 is relatively blunt. A bore 39 extends axially of the body 31 opening through the blunt end 32 and the pointed end 35 to receive a fishline 40 which is threaded therethrough. The line 40 is knotted at 41 and 42 at opposite ends of the bore 39 to prevent the fish weight 30 from moving on the line 40.

The body of the fish weight 30 has a length substantially in excess of three times the maximum diameter of the body 31. The outer surface of the body 31 is completely smooth so that no surfaces are provided for causing the body 31 to become snagged.

Figure 6:
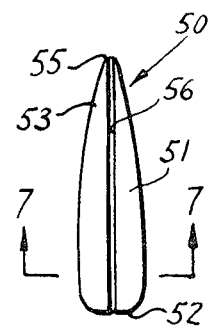
FIG. 6 is a side elevation of still another modified form of the invention.
Figure 7:
FIG. 7 is a transverse sectional view taken along the line 7—7 of FIG. 6 looking in the direction of the arrows.

Referring now to FIGS. 6 and 7, another modified form of the invention is illustrated wherein a fishhook weight 50 has a body 51, a generally circular cross section terminating in a blunt lower end 52 and having a generally conical tapering upper end portion 53 which terminates in a generally pointed end 55. A slot 56 extends longitudinally of the body 51 from the blunt end 52 to the pointed end 55 and has its inner edge 57 lying substantially along the axis of the body 51.

The fishline (not shown) is arranged to be seated in the slot 56 at the inner edge 57 thereof and the fish weight 50 is then compressed to close the slot 56 about the fishline to clamp the body 51 thereto. The body 51 is completely smooth with the exception of the slot 56 and has no projections or openings which could snag the weight 50 on obstructions in the water.

Figure 2:
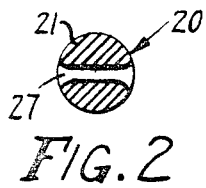
FIG. 2 is a transverse sectional view taken along the line 2—2 of FIG. 1 looking in the direction of the arrows.
Figure 3:
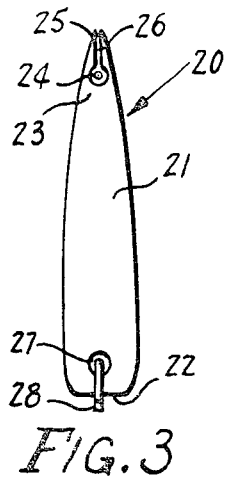
FIG. 3 is a side elevation of another side of the invention illustrated in FIG. 1.
Figure 8:
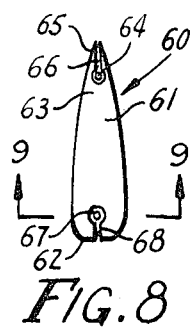
FIG. 8 is a side elevation of still another modified form of the invention.
Figure 9:
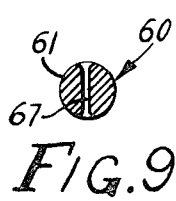
FIG. 9 is a transverse sectional view taken along the line 9—9 of FIG. 8 looking in the direction of the arrows.

Referring now to FIGS. 8 and 9, another modified form of the invention is illustrated wherein a fish weight generally indicated at 60 includes a body 61, a generally circular cross section having a blunt lower end 62 and a generally conical tapering upper end portion 63 which terminates in a substantially pointed upper end 65. A transverse bore 64 opens through the tapered upper end portion 63 of the body 61 and a slot 66 opens upwardly from each end of the bore 64 to meet at a point 65 to provide a recess to receive a fishline (not shown) which is adapted to be tied thereto in the same manner as the fishline is tied to the form of the invention illustrated in FIGS. 1 through 3. A bore 67 opens through the body 61 adjacent the blunt end 62 thereof and is arranged parallel to the bore 64. A slot 68 extends longitudinally of the body 61 from each end of the bore 67 to the blunt end 62 to form a recess to receive the fishline (not shown) which extends through the bore 67 and is knotted into the slot 68. The body 61 of the fish weight 60 is smooth on its outer surface with the exception of the bores 64, 67 and the slots 66, 68 to diminish the possibilities of the weight 60 becoming snagged. The weight 60 has a length substantially in excess of three times the greatest diameter of the body 61 to provide a slim form less likely to become snagged.

Figure 10:
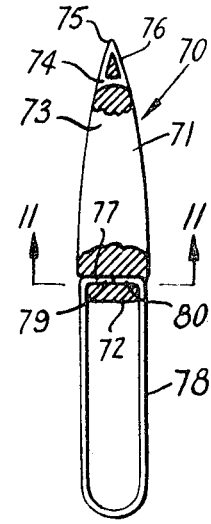
FIG. 10 is a side elevation of a further modified form of the invention shown partially broken away and in section for convenience of illustration.
Figure 11:
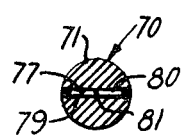
FIG. 11 is a transverse sectional view taken along the line 11—11 of FIG. 10 looking in the direction of the arrows.

Referring to FIGS. 10 and 11, another modified form of the invention is illustrated wherein a fish weight is indicated generally at 70 and includes a generally circular body 71 having a blunt lower end 72 and a conically tapering upper end portion 73 which is pierced by a transverse bore 74. The conical tapering upper end portion 73 terminates in a substantial point 75 at its upper end as can be seen in FIG. 10. A groove 76 is formed longitudinally of the body 71 and extends upwardly from opposite ends of the bore 74 to meet at the point 75 to provide a recess to receive a loop of fishline (not shown) which is knotted therein. The lower end of the body 71 has a transverse bore 77 extending thereacross adjacent the blunt end 72 and parallel to the bore 74. A spring loop 78 depends from the body 71 and has free ends 79, 80 which are received in the bore 77 and meet at 81 in the center of the bore 77. The spring loop 78 is adapted to have a fishhook or fishline attached thereto by knotting or looping or any other desired method.

The surface of the body 71 is completely smooth with the exception of the bore 77, bore 74 and groove 76 to diminish the possibility of the weight 70 becoming snagged. The length of the weight 70 is substantially greater than three times the maximum diameter of the body 71 to provide a slim form less likely to become snagged.

The weights may be made from any suitable heavy material such as lead or steel.

Having thus described the preferred embodiments of the invention, it should be understood that numerous structural modifications and adaptations may be resorted to without departing from the spirit of the invention.

What is claimed is:

1. A long relatively thin snagless fishline weight comprising a body having a generally circular transverse cross section and a conically tapering upper end portion terminating in a substantial point of substantially the same diameter as a fishline attached thereto, said body having a blunt lower end and being of a length substantially greater than three times the maximum diameter thereof, and means for attaching said body to a fishline, said means including a transverse bore extending through said body adjacent each of the upper and lower terminal ends thereof, said bores each having each end thereof outwardly flared, said body having a longitudinal groove extending from opposite ends of each of said bores to said terminal ends of said body, said means including connecting elements secured within said bores and said grooves and not extending radially beyond the surface of said body.

* * * * *